3,686,178
PREPARATION OF 4-ARYL-2(1H)-QUINAZO-
LINONES AND THIONES
George A. Cooke, Denville, and William J. Houlihan,
Mountain Lakes, N.J., assignors to Sandoz-Wander,
Inc., Hanover, N.J.
No Drawing. Continuation-in-part of applications Ser.
No. 819,435 and Ser. No. 819,450, Apr. 25, 1969. This
application Sept. 16, 1970, Ser. No. 72,797
Int. Cl. C07d 51/48
U.S. Cl. 260—251 QB                15 Claims

ABSTRACT OF THE DISCLOSURE

The present invention discloses preparation of 2(1H)-quinazolinones and 2(1H)-quinazolin-thiones from the group of 4-aryl-2(1H)-quinazolinones, 3,4-dihydro-4-aryl-2(1H)-quinazolinones, and 3,4-dihydro-4-aryl-2(1H)-quinazolin-thiones involving key intermediates which are N-alkyl-N-arylureas and N-alkyl-N-arylthioureas which are reacted with a benzaldehyde to obtain a 3,4-dihydro-4-aryl-2(1H)-quinazolinone or a 3,4-dihydro-4-aryl-2-(1H)-quinazolin-thione, respectively, which may be oxidized to obtain 3,4-unsaturated 4-aryl-2(1H)-quinazolinones.

---

This application is a continuation-in-part of our prior applications Ser. Nos. 819,435 and 819,450, both filed Apr. 25, 1969 and both now abandoned.

The present invention relates to preparation of quinazolinones and quinazolin-thiones, and more particularly to preparation of 3,4-unsaturated-1-substituted-4-aryl-2(1H)-quinazolinones, the 3,4-dihydro derivatives thereof and 3,4-dihydro-2(1H)-quinazolin-thiones, the latter two being useful in preparation of the former.

Of interest because of pharmacological activity in animals are the compounds which are 3,4-unsaturated-1-substituted-4-aryl-2(1H)-quinazolinones, 3,4-dihydro-1-substituted-4-aryl-2(1H)-quinazolinones and 3,4-dihydro-1-substituted-4-aryl-2(1H)-quinazolin-thiones.

The main object of the present invention is to provide procedures for the preparation of said 2(1H)-quinazolinones and said quinazolin-thiones.

In accordance with the invention it has been found that 3,4-dihydro-4-aryl-2(1H)-quinazolinones and quinazolin-thiones represented by the Formula IA:

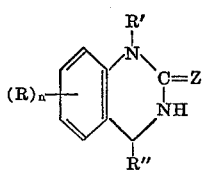

wherein

Z is oxygen or sulfur;
R is hydrogen; halo having an atomic weight no greater than 36; lower alkyl of 1 to 5 carbon atoms, preferably containing 1 to 3 carbon atoms; or lower alkoxy of 1 to 4 carbon atoms preferably containing 1 to 2 carbon atoms;
n is 1 or 2; provided that R is not more than one halo substituent when n is 2, further provided that R is a straight chain substituent when R is an organic substituent in the 5- or 8-position, and also provided that R represents no more than one branched organic substituent;
R' is lower alkyl of 1 to 6 carbon atoms, e.g., methyl, ethyl, propyl and isopropyl;

R" is phenyl; or substituted phenyl of the formula:

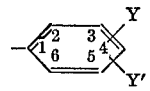

Y is halo of atomic weight not exceeding 36; lower alkyl of 1 to 3 carbon atoms; lower alkoxy of 1 to 2 carbon atoms; or trifluoromethyl; and
Y' is hydrogen; halo of atomic weight not exceeding 36; lower alkyl of 1 to 3 carbon atoms; or lower alkoxy of 1 to 2 carbon atoms; provided that Y and Y' are from the group of hydrogen and halo when in the 2- or 6-positions, are produced by reacting in a Step A a compound of the Formula II:

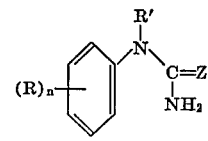

wherein Z, R, n, and R' are as defined, with a benzaldehyde of Formula III:

R"—CHO                III wherein R" is as defined, at elevated temperatures whereby compounds of the Formula IA are obtained.

The 3,4-dihydro-4-aryl-2(1H)-quinazolinones and -quinazolin-thiones represented by the Formula IA may then be oxidized in a Step A–1 to obtain the corresponding 4-aryl-2(1H)-quinazolinones of Formula IB:

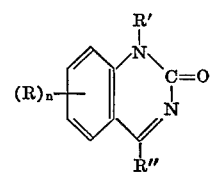

wherein R, n, R' and R" are as defined.

The preparation of compounds of Formula IA by Step A involving reaction of a Compound II with a Compound III is carried out at elevated temperatures in the range of 30° C. to 120° C., preferably 50° C. to 100° C. The reaction is carried out under anhydrous or nearly anhydrous conditions and in the presence of an acid as catalyst and dehydrating agent but which acid is otherwise non-reactive with Compounds II and III. The suitable acids are the "dehydrating acids," which term as used herein means those known types of acids useful in effecting a condensation reaction between a primary amine and an aldehyde under anhydrous or nearly anhydrous conditions, which type of condensation is involved inter alia in the reaction of Step A. Such dehydrating acids include, for example, the inorganic mineral acids such as hydrochloric acid (hydrogen chloride in an aromatic solvent) or an organic acid such as trifluoroacetic acid, oxalic acid or an arylsulfonic acid or an alkylsulfonic acid such as benzenesulfonic acid, p-toluenesulfonic acid and methanesulfonic acid, the preferred acids including methanesulfonic acid and p-toluenesulfonic acid. The amount of acid catalyst may vary over a fairly wide range and is not particularly critical. Desirably, the amount of acid is controlled at a minor amount not substantially exceeding about one molar equivalent of acid per mol of the Compound II, and is most preferably a minor catalytic amount between 0.005 to 0.5 molar equivalent based on the urea. The reaction is conveniently carried out in an organic solvent which may be any of several conventional organic solvents providing an inert reaction medium, preferably an aromatic solvent such as benzene and the like. Depending upon known factors such as reaction temperature, etc. the reaction may take typically between 1 to 50 hours. The reaction product of Formula IA may be isolated from the reaction mixture of Step A by working up by established procedures.

We had postulated that the preparation of Compounds IA by reaction of Compounds II and III in Step A proceeds through an intermediate of the Formula A:

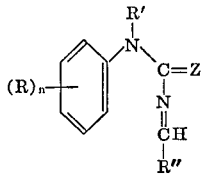

A wherein Z, R, n, R' and R" are as defined. In our experimentation conducted with reference to the more preferred embodiments of the invention it was evident that an intermediate of Formula A had been formed on merely a transient basis, and that the reaction of Step A may directly produce Compounds IA in good yields in essentially a single stage operation when conducted under the preferred conditions as demonstrated, for example, in Step C of Example 1, hereinafter. It will be evident that Compounds A prepared and/or isolated by any procedure may be readily cyclized to obtain Compounds IA under the conditions of the Step A reaction, as described.

The preparation of Compounds IB from Compounds IA by the reaction of a Step A–1 may be conveniently carried out in an inert organic solvent at temperatures in the range of 0° C. to 120° C., typically 15° C. to 100° C. when Z is oxygen and temperatures of 0° C. to 60° C., typically 15° C. to 40° C. when Z is sulfur. Representative of oxidizing agents useful in the reaction are the alkali metal permanganates, such as sodium or potassium permanganate, manganese dioxide and mercuric acetate, preferably potassium permanganate. The organic solvent may be any of several conventional organic solvents including by way of illustration the lower alkanols, e.g., methanol and ethanol, the aromatic solvents, e.g., benzene and the ethers including the cyclic ethers, e.g., dioxane. The reaction product of Formula IB may be isolated from the Step A–1 reaction by working up by established procedures.

The compounds of Formula II in which Z is oxygen employed as starting material in Step A are either known or may be prepared by one or more known procedures. A preferred method for preparation of Compounds II in which Z is oxygen involves subjecting in a Step B a compound of the Formula IV:

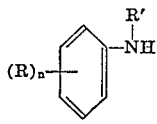

IV wherein R, n and R' are as defined, to reaction with isocyanic acid which is provided in a conventional manner by forming in situ from an alkali metal isocyanate and a suitable acid such as a lower aliphatic carboxylic acid, preferably acetic acid. The reaction of Step B may be suitably carried out at temperatures in the range of 10° C. to 50° C. and in an organic solvent medium which may be conveniently a lower aliphatic carboxylic acid such as excess acetic acid.

The compounds of Formula II in which Z is oxygen may also be provided starting with a compound of Formula IV in a Step B–1 by subjecting the latter to reaction with nitrourea at temperatures typically in the range of 80° C. to 120° C. in an inert organic solvent of conventional type, preferably a lower alkanol such as ethanol.

The reaction product of Formula II in which Z is oxygen may be isolated from the reaction of Step B and B–1 by working up by conventional procedures.

The compounds of Formula II in which Z is sulfur may be suitably prepared by subjecting in a Step C a compound of the Formula V:

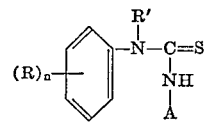

V wherein R', R and n are as defined and A is the residue of an acid halide, to alkaline hydrolysis at elevated temperatures.

The reaction of Step C may be carried out at temperatures in the range of 50° C. to 140° C., preferably 80° C. to 120° C. The hydrolysis of Step C is suitably effected employing an alkali metal hydroxide, preferably sodium or potassium hydroxide. The reaction is carried out in a suitable liquid solvent medium preferably comprising water and a water miscible inert organic solvent of conventional type such as an ether including the cyclic ethers, preferably dioxane. The reaction product of Formula II may be isolated from the reaction mixture of Step C by working up according to established procedures.

The compounds of Formula IV are either known or can be prepared from known materials by established procedures. A preferred method of preparation of compounds IV employs as starting material a compound of Formula VI:

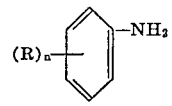

VI wherein R and n are as defined, and involves subjecting said compound VI to tosylation, alkylation and detosylation in a manner known per se. It will be noted that compounds IV in which R' is a branched alkyl with the branching occurring on the carbon atom attached to amino nitrogen, e.g., R' is isopropyl, may be most conveniently and preferably prepared by reacting directly a compound VI with the appropriate alkyl halide, as illustrated hereinafter in Step A of Example 1.

The compounds of Formula V may be prepared by subjecting in a Step D a compound of the Formula IV:

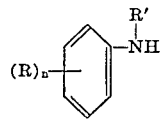

IV wherein R', R and n are defined, to reaction with an isothiocyanate of Formula VIII:

   M—N=C=S   VIII wherein M is a cation, and an acid halide of the Formula IX:

   AX   IX wherein A is as previously indicated and X is halogen, preferably chloro, or to the action of the reaction product of said acid halide and isothiocyanate.

The preparation of compound V from a compound IV is conveniently carried out in an inert solvent medium at temperatures in the range of 10° C. to 80° C., preferably 30° C. to 70° C. The reaction may be understood as including the reaction of compound IV with the reaction product of the acid halide of Formula IX and isothiocyanate of Formula VIII. For this reason, it is generally preferred to first react the acid halide of Formula IX and compound VIII and then add the starting compound IV to the resulting reaction mixture. The reaction of the acid halide and isothiocyanate is preferably initiated at lower temperatures in the range of 10° C. to 40° C. As acid halides one employs any of the conventional acid halides which do not carry substituents or functional groups leading to undesired reactions. The more suitable materials are represented, for example, by acetyl chloride and benzoyl chloride, preferably benzoyl chloride. The preferred compounds VIII are those most readily reacting with the acid halide to eliminate as by-product a halide of the cation M. The preferred cations M may be represented, for example, by a cation of an alkali metal, e.g., sodium, and by the cation of ammonia, e.g., the ammonium salt. The more preferred compound VIII is ammonium isothiocyanate. Organic solvents suitable for the reaction are of conventional type which provide an inert medium. Such solvents include by way of example the lower alcohols, ketones and cyclic ethers, preferably acetone. The reaction product of Formula V may be recovered from the reaction of Step D by working up by conventional procedures. It will also be noted that Steps C and D may be combined to the extent that completely isolated and/or recovery of the product of Step D is not necessary, and that is certain cases the reaction mixtures from the reaction of Step D may contain varying amounts of the compound of Formula II in which Z is sulfur.

The compounds of Formulae IA and IB may be produced, isolated and converted to various acid addition salts of conventional type including those which are pharmaceutically acceptable, if desired.

The compounds of Formulae IA and IB are useful because they possess pharmaceutical activity in animals. In particular, the compounds IA and IB are useful as anti-inflammatory agents as indicated by the Carrageenan-induced edema test in rats, as disclosed for Z being oxygen in application Ser. No. 741,807, filed July 1, 1968 and for Z being sulfur in application Ser. No. 819,477, filed Apr. 25, 1969 and its abandoned parent application Ser. No. 741,805, filed July 1, 1968, all of which applications are abandoned. For such use, the compounds may be combined with a pharmaceutically acceptable carrier, and such other conventional adjuvants as may be desired, and preferably administered orally in such forms as tablets, capsules, elixirs, suspensions and the like. For the above-mentioned use, the dosage administered will, of course, vary depending upon known factors such as the particular compound used and mode of administration. However, in general, the compounds of Formula IA provide satisfactory results when administered at a daily dose of from about 2 milligrams to about 200 milligrams per kilogram of body weight, preferably given in divided doses 2 to 4 times a day, with daily dosage for large mammals ranging between 140 milligrams to 2000 milligrams and individual doses ranging between 70 to 1000 milligrams. The compounds of Formula IB are in general more potent with satisfactory results obtained at a daily dose of from about 0.15 to 100 milligrams per kilogram of body weight, with daily dosage for large mammals ranging between about 10 milligrams to 1000 milligrams and individual doses between 3 milligrams to 500 milligrams. Compounds of the Formulae IA and IB may also provide an analgesic and anti-pyretic activity in animals on administration within the dosage ranges above-indicated for the two respective groups.

The following examples are for purposes of illustration only.

EXAMPLE 1

1-isopropyl-7-methyl-4-phenyl-2(1H)-quinazolinone

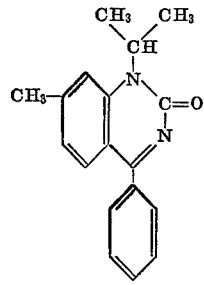

STEP A.—PREPARATION OF N-ISOPROPYL-3-METHYLAMILINE

To a solution of 3.4 gms. of isopropyl iodide and 2 gms. of triethylamine in 50 mls. n-propanol is added 1 gm. of m-toluidine in one portion. The reaction mixture is then refluxed for 18 hours. The reaction is cooled and any precipitate which separates is removed by filtration. The clear brown filtrate is evaporated at reduced pressure and the resultant oil is triturated with 50 mls. of diethyl ether. Any solid which thus forms is removed by filtration and the filtrate is evaporated at reduced pressure. The treatment with diethyl ether is repeated as long as any solid separates. The oil obtained is subjected to column chromatography and the fraction eluted with 75 mls. of $CH_2Cl_2$ is collected and evaporated at reduced pressure. The resultant n-isopropyl-3-methylaniline has a B.P. of 109° C./51 mm./Hg.

STEP B.—PREPARATION OF N-ISOPROPYL-N-(m-TOLYL)UREA (a) To a solution of 4.5 gms. of N-isopropyl-3-methylaniline in 20 mls. of 95% ethanol is added 4.1 gms. of nitrourea and the resulting mixture warmed carefully on a steambath for 30 minutes. The reaction mixture is then heated on a steambath for 2 hours, and concentrated at reduced pressure. The resultant is treated with 200 mls. of boiling water, and the resulting aqueous phase concentrated at reduced pressure at about 60° C. The resulting residue is dissolved in 100 mls. of chloroform, washed twice with 15 mls. of a 10% aqueous solution of sodium bicarbonate, once with 10 mls. of water, and the solution dried and evaporated at reduced pressure. The residue is recrystallized from petroleum ether to provide N-isopropyl-N-(m-tolyl)urea, M.P. 89–90° C.

(b) A solution of 3.5 gms. of N-isopropyl-3-methylaniline and 1.6 gms. of powdered sodium cyanate in 25 mls. of glacial acetic acid is stirred at room temperature for 18 hours. The reaction mixture is then evaporated at reduced pressure with the addition of chlorform from time to time to facilitate the evaporation. The resultant semi-solid is triturated with 150 mls. of diethylether and the thus formed solid removed by filtration. The filtrate is evaporated at reduced pressure and the residue is taken up in sufficient petroleum ether to bring about dissolution at room temperature. The solution is decolorized with charcoal, washed twice with 15 mls. of a 10% aqueous solution of sodium bicarbonate, once with 10 mls. of water, dried, and evaporated at reduced pressure. The resulting white solid is recrystallized from petroleum ether to provide N-isopropyl-N-(m-tolyl) urea, M.P. 89–91° C.

STEP C.—PREPARATION OF 1-ISOPROPYL-4-PHENYL-7-METHYL-3,4-DIHYDRO-2(1H)-QUINAZOLINONE

A solution of 1 gm. of N-isopropyl-N-(m-tolyl)urea, 0.4 gm. of benzaldehyde and a catalytic amount (about 10 mg.) of p-toluenesulphonic acid in 30 mls. of benzene is refluxed for 22 hours. The cooled reaction mixture is washed once with 10 mls. of 2 N sodium hydroxide and 3 times with 12 mls. of a 10% aqueous solution of sodium bisulphite, dried and evaporated at reduced pressure. The residue is recrystallized from petroleum ether or cyclohexane to provide 1-isopropyl-4-phenyl-7-methyl-3,4-dihydro-2(1H)-quinazolinone, M.P. 160–161.1° C.

STEP D.—PREPARATION OF 1-ISOPROPYL-7-METHYL-4-PHENYL-2(1H)-QUINAZOLINONE

A mixture of .4 g. of 3,4-dihydro-1-methyl-4-phenyl-2(1H)-quinazolinone, 0.5 g. of manganese dioxide and 25 ml. of benzene is refluxed for a period of 20 hours. The resulting mixture is filtered through diatomaceous earth obtained under the trademark "Celite," evaporated to dryness, dissolved in methylene chloride, treated with charcoal, evaporated in vacuo and the residue crystallized from diethyl ether on adding pentane (1:1) to obtain 1-isopropyl-7-methyl-4-phenyl-2(1H)-quinazolinone, M.P. 137–138° C.

EXAMPLE 1a

The following is an alternate preferred procedure for preparation of N-isopropyl-3-methylaniline according to Step A of Example 1.

STEP A.—PREPARATION OF N-ISOPROPYL-3-METHYLANILINE

To a solution of 3.4 gms. of isopropyl iodide and 2 gms. of triethylamine in 50 mls. n-propanol is added 1 gm. of m-toluidine in one portion. The reaction mixture is then refluxed for 18 hours. The reaction is cooled and any precipitate which separates is removed by filtration. The clear brown filtrate is evaporated at reduced pressure and the resultant oil is triturated with 50 mls of petroleum ether (B.P. 30–60° C.). Any solid which thus forms is removed by filtration and the filtrate is evaporated at reduced pressure. The oil obtained is subjected to column chromatography and the fraction eluted with 75 mls. of $CH_2Cl_2$ is collected and evaporated at reduced pressure. The resultant n-isopropyl-3-methylaniline has a B.P. of 109° C./51 mm./Hg.

EXAMPLE 2

6-chloro-1-methyl-4-phenyl-2(1H)-quinzolinone

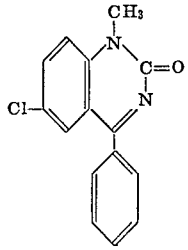

STEP A.—PREPARATION OF N-FORMYL-N-METHYL-4-CHLOROANILINE

A mixture of 63.8 gms. of p-chloroaniline and 28.9 gms. of trimethylorthoformate is prepared in a flask fitted with a 3″ fractionation column. To the stirred mixture is added dropwise 2 gms. of concentrated sulphuric acid. The mixture is then heated and any methanol formed is permitted to distill from the reaction vessel. The residue is distilled at a pressure of about 20 mm./Hg and N-formyl-N-methyl-4-chloroaniline is collected at a temperature of about 130–140° C.

STEP B.—PREPARATION OF N-METHYL-4-CHLOROANILINE

A mixture of 80 gms. of N-formyl-N-methyl-4-chloroaniline and 200 mls. of 10% hydrochloric acid is refluxed for 18 hours. The mixture is cooled and made basic with 50% aqueous sodium hydroxide. The resultant oil is separated from the aqueous phase, which later is saturated with solid sodium carbonate and extracted twice each with 250 mls. of diethylether. The extracts are combined with the previously obtained oil and the whole dried and evaporated. Distillation of the residue at a pressure of 40 mm. provides N-methyl-4-chloroaniline, B.P. 132–144°/40 mm./Hg.

STEP C.—PREPARATION OF 6-CHLORO-1-METHYL-4-PHENYL-3,4-DIHYDRO-2(1H)-QUINAZOLINONE

To a solution of 0.5 gm. of N-methyl-N-(4-chlorophenyl) urea (prepared analogously to Step B(b) of Example 1), 0.25 gm. of benzaldehyde and a catalytic amount of about 10 mg. of p-toluene-sulphonic acid in 25–30 mls. of benzene is refluxed for 20 hours. The cooled reaction mixture is washed twice with 25 mls. of water, dried and evaporated at reduced pressure. The residue is triturated with about 400 mls. of petroleum ether (B.P. 30–60°) and about 10 mls. of benzene is added to obtain on recrystallization from the solvent system 6-chloro-1-methyl-4-phenyl-3,4 - dihydro - 2(1H) - quinazolinone, M.P. 184–187° C.

STEP D.—PREPARATION OF 6-CHLORO-1-METHLY-4-PHENYL-2(1H)-QUINAZOLINONE

Following the procedure of Step D of Example 1 and employing approximately similar proportions there is obtained on crystallization from ethyl acetate the compound 6 - chloro - 1 - methyl - 4 - phenyl-2(1H)-quinazolinone, M.P. 223–224° C.

EXAMPLE 3

Following the procedures of the preceding examples and employing the appropriate corresponding starting materials in approximately similar proportions there is obtained the following:

(A) 6,7 - dimethyl - 1 - isopropyl - 4 - phenyl - 3,4-dihydro - 2(1H) - quinazolinone, M.P. 156–160° C. which is oxidized to obtain 6,7-dimethyl-isopropyl-4-phenyl-2(1H)-quinazolinone, M.P. 135–137° C.

EXAMPLE 3A

Following the procedures of the preceding examples and employing the appropriate corresponding starting materials in approximately similar proportions except that methanesulfonic acid is substituted for the p-toluenesulfonic acid, there is obtained the following:

1 - isopropyl - 7 - methyl - 4 - phenyl - 3,4-dihydro-2(1H)-quinazolinone, M.P. 160–161° C.

1 - isopropyl - 6 - methoxy - 4 - (4-isopropylphenyl)-3,4-dihydro-2(1H)-quinazolinone, M.P. 120–121° C.

EXAMPLE 4

1-isopropyl-7-methyl-4-phenyl-2(1H)-quinazolinone

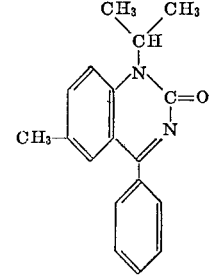

STEP A.—PREPARATION OF N-ISOPROPYL-3-METHYLANILINE

To a solution of 3.4 gms. of isopropyl iodide and 2 gms. of triethylamine in 50 mls. m-propanol is added 1 gm. of m-toluidine in ane portion. The reaction mixture is then refluxed for 18 hours. The reaction is cooled and any precipitate which separates is removed by filtration. The clear brown filtrate is evaporated at reduced pressure and the resultant oil is triturated with 50 mls. of diethyl ether. Any solid which thus forms is removed by filtration and the filtrate is evaporated at reduced pressure. The treatment with diethyl ether is repeated as long as any solid separates. The oil obtained is subjected to column chromatography and the fraction eluted with 75 mls. of $CH_2Cl_2$ is collected and evaporated at reduced pressure. The resultant n-isopropyl-3-methylaniline has a B.P. of 109° C./51 mm./Hg.

STEP B.—PREPARATION OF N-ISOPROPYL-N-(m-TOLYL)-N′-BENZOYLTHIOUREA

To a solution of 10 gms. of ammonium thiocyanate in 100 mls. of acetone is added a solution of 9.5 gms. of benzoyl chloride in 75 mls. of acetone. The mixture is stirred during this addition and for 30 minutes subsequently. Then a solution of 10 gms. of N-isopropyl-3-methylaniline in 75 mls. of acetone is added dropwise, also with stirring. At the end of this addition the reaction mixture is refluxed for 3 hours, cooled, 200 mls. of methylene chloride are added, and the mixture filtered.

The filter cake is washed with a further 100 mls. of methylene chloride and the filtrates combined, evaporated under reduced pressure. The residue is recrystallized from isopropanol to obtain N-isopropyl-N-(m-tolyl)-N'-benzoylthiourea, M.P. 112–113° C.

STEP C.—PREPARATION OF N-ISOPROPYL-n-(m-TOLYL)THIOUREA

To a solution of 45 mls. of dioxane in 200 mls. of water is added 27 gms. of sodium hydroxide and the mixture stirred until dissolution is complete. Then 15 gms. of N-isopropyl-N-(m-tolyl)-N'-benzoylthiourea is added and the resulting reaction mixture refluxed for 4 hours. The resulting mixture is cooled, acidified with concentrated hydrochloric acid, and made slightly basic with concentrated ammonium hydroxide. The resulting basic aqueous solution is filtered free of any solids and the solids are washed with 100 mls. of chloroform. The clear filtrate is extracted three times each with 200 mls. of chloroform and to these filtrates is added the chloroform used to wash the solids. The combined solution is dried, evaporated at reduced pressure, and the residue recrystallized from cyclohexane to obtain N-isopropyl-N-(m-tolyl)thiourea, M.P. 126–127° C.

STEP D.—PREPARATION OF 1-ISOPROPYL-7-METHYL-4-PHENYL-3,4-DIHYDRO-2(1H)-QUINAZOLIN-THIONE

To 25 mls. of a saturated solution of anhydrous hydrogen chloride gas in anhydrous benzene is added 1 gm. of N-isopropyl-N-(m-tolyl)thiourea. The resulting mixture is stirred and a solution of 2 gms. of benzaldehyde in 10 mls. of anhydrous benzene is added dropwise. The reaction mixture is then refluxed for 15 hours, cooled, and evaporated at reduced pressure to obtain a semi-solid which is triturated with 50 mls. of diethyl ether. The thus-formed solid is removed by filtration and the filtrate washed several times with 10% aqueous solution of sodium bisulphite. The ethereal solution is then evaporated at reduced pressure to obtain 1-isopropyl-7-methyl-4-phenyl-3,4-dihydro-quinazolin-2(1H)-thione as an amorphous powder which can be crystallized from diethyl ether/petroleum ether to obtain crystals of 1-isopropyl-7-methyl-4-phenyl-3,4-dihydro-quinazolin-2(1H)-thione, M.P. 125–127° C.

STEP E.—PREPARATION OF 1-ISOPROPYL-7-METHYL-4-PHENYL-2(1H)-QUINAZOLINONE

To a solution of 500 mg. of 1-isopropyl-7-methyl-4-phenyl-3,4-dihydro-2(1H)-quinazoline-thione in 20 ml. of dioxane is added about 250 mg. of potassium permanganate as an aqueous solution in divided portions with stirring. The resulting mixture is stirred at room temperature (20° C.) for 5 hours, then treated by addition of water and extracted with methylene chloride. The resulting methylene chloride solution is treated with charcoal, filtered through "Celite," concentrated and the resulting residue crystallized from ethyl acetate to obtain 1-isopropyl-7-methyl-4-phenyl-2(1H)-quinazolinone, M.P. 137–138° C.

What is claimed is:

1. The process for preparation of a compound of the formula:

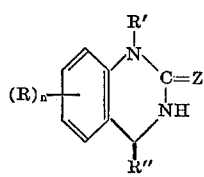

wherein

Z is oxygen or sulfur;
R' is lower alkyl;
R represents hydrogen; halo having an atomic weight no greater than 36; lower alkyl, or lower alkoxy; $n$ is 1 or 2; provided that R is not more than one halo substituent when $n$ is 2, further provided that R is a straight chain substituent when R is an organic substituent in the 5- or 8-position, and also provides that R represents no more than one branched organic substituent;

R" represents phenyl; or substituted phenyl of the formula:

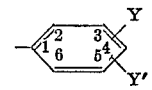

Y represents halo of atomic weight not exceeding 36; lower alkyl; lower alkoxy; or trifluoromethyl; and
Y' represents hydrogen; halo of atomic weight not exceeding 36; lower alkyl; or lower alkoxy; provided that Y and Y' are from the group of hydrogen and halo when in the 2- or 6-position;

said process comprising subjecting a N-alkyl-N-arylurea of the formula:

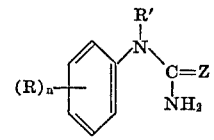

wherein Z, R, $n$ and R' are as defined, to reaction with a compound of the formula:

R"—CHO wherein R" is as defined, at temperature in the range of 30° C. to 120° C. in an organic solvent under substantially anhydrous conditions and in the presence of a dehydrating acid.

2. The process of claim 1 in which the amount of dehydrating acid is not in excess of one molar equivalent per mol of the N-alkyl-N-arylurea.

3. The process of claim 2 in which the ratio of acid to N-alkyl-N-arylurea is in the range of 0.005 to 0.5 mol of acid equivalent per mol of N-alkyl-N-arylurea.

4. The process of claim 3 in which the acid is an organic sulfonic acid from the group of arylsulfonic acid.

5. The process of claim 4 in which the reaction temperature is in the range of 50° C. to 100° C.

6. The process of claim 5 in which the acid is p-toluene-sulfonic acid.

7. The process of claim 5 in which the acid is methane-sulfonic acid.

8. The process of claim 5 in which the 3,4-dihydro-2(1H)-quinazolinone is prepared under anhydrous conditions.

9. The process of claim 2 in which Z is oxygen.

10. The process of claim 5 in which Z is oxygen.

11. The process of claim 10 in which there is prepared 1-isopropyl-7-methyl-4-phenyl-3,4-dihydro 2(1H)-quinazolinone.

12. The process of claim 1 in which Z is sulfur.

13. The process of claim 12 in which the acid is hydrochloric acid.

14. The process of claim 12 in which there is prepared 1-isopropyl-7-methyl-4-phenyl-3,4-dihydro-2(1H)-quinazolin-thione.

15. The process of claim 5 in which Z is sulfur.

References Cited

UNITED STATES PATENTS 3,547,921  12/1970  Hardtmann et al. _____ 260–251

ALEX MAZEL, Primary Examiner

R. V. RUSH, Assistant Examiner

U.S. Cl. X.R.

260—999